United States Patent
Hou et al.

(10) Patent No.: US 11,132,559 B2
(45) Date of Patent: Sep. 28, 2021

(54) ABNORMALITY DETECTION METHOD, APPARATUS, AND DEVICE FOR UNMANNED CHECKOUT

(71) Applicant: Advanced New Technologies Co., Ltd., Grand Cayman (KY)

(72) Inventors: Zhangjun Hou, Hangzhou (CN); Xudong Yang, Hangzhou (CN); Xiaobo Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/086,150

(22) Filed: Oct. 30, 2020

(65) Prior Publication Data
US 2021/0049370 A1 Feb. 18, 2021

Related U.S. Application Data

(63) Continuation of application No. PCT/CN2019/089187, filed on May 30, 2019.

(30) Foreign Application Priority Data

Aug. 1, 2018 (CN) .......................... 201810865617.8

(51) Int. Cl.
*G06K 9/00* (2006.01)
*G07C 9/38* (2020.01)
*G06Q 20/18* (2012.01)

(52) U.S. Cl.
CPC ..... *G06K 9/00778* (2013.01); *G06K 9/00355* (2013.01); *G07C 9/38* (2020.01); *G06Q 20/18* (2013.01)

(58) Field of Classification Search
CPC .. G06K 9/00778; G06K 9/00355; G07C 9/38; G06Q 20/18
See application file for complete search history.

(56) References Cited

U.S. PATENT DOCUMENTS 6,263,088 B1 * 7/2001 Crabtree ............... G01S 3/7865
348/169
8,418,919 B1  4/2013 Beyda
(Continued)

FOREIGN PATENT DOCUMENTS

| CN | 102930524 | 2/2013 |
| CN | 103530892 | 1/2014 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Solomon G Bezuayehu
(74) *Attorney, Agent, or Firm* — Fish & Richardson P.C.

(57) ABSTRACT

Embodiments of the present specification provide abnormality detection methods, apparatuses, and devices for unmanned checkout. In an embodiment, a method comprising: obtaining, by a depth camera in a detection area of a photographing area for unmanned checkout, image data that comprises a depth image and a corresponding RGB image; detecting, based on the image data, one or more customers that enter the detection area for unmanned checkout using one or more of headcount detection to detect a quantity of the one or more customers or gesture detection to detect one or more gestures of the one or more customers; and in response to determining that the quantity of the one or more customers is greater than a predetermined threshold or the one or more gestures comprise an abnormal gesture, notifying a central control system to stop the unmanned checkout and trigger an alarm.

27 Claims, 5 Drawing Sheets

(56) References Cited

U.S. PATENT DOCUMENTS

| | | | |
|---|---|---|---|
| 9,589,433 B1* | 3/2017 | Thramann | G01S 3/7864 |
| 2003/0107649 A1 | 6/2003 | Flickner et al. | |
| 2007/0205277 A1* | 9/2007 | Tashiro | G07G 3/006 235/383 |
| 2009/0134221 A1* | 5/2009 | Zhu | A47F 9/048 235/383 |
| 2012/0087572 A1 | 4/2012 | Dedeoglu et al. | |
| 2012/0309532 A1 | 12/2012 | Ambrus et al. | |
| 2012/0330788 A1 | 12/2012 | Hanson et al. | |
| 2013/0051667 A1 | 2/2013 | Deng et al. | |
| 2013/0096977 A1* | 4/2013 | Finch | G06K 9/00778 705/7.26 |
| 2014/0061291 A1* | 3/2014 | Madej | G06K 7/1096 235/375 |
| 2014/0214608 A1* | 7/2014 | Pedley | G06Q 30/0643 705/26.35 |
| 2015/0234477 A1* | 8/2015 | Abovitz | G06K 9/00214 382/103 |
| 2016/0210829 A1* | 7/2016 | Uchida | G06T 7/20 |
| 2017/0206516 A1* | 7/2017 | Watson | G06Q 20/208 |
| 2017/0249491 A1 | 8/2017 | MacIntosh et al. | |
| 2017/0272651 A1* | 9/2017 | Mathy | H04N 13/257 |
| 2018/0096576 A1* | 4/2018 | Anderholm | G01S 13/886 |
| 2018/0167547 A1* | 6/2018 | Casey | G06K 9/00771 |
| 2018/0197139 A1* | 7/2018 | Hill | G06Q 10/0832 |
| 2018/0338006 A1* | 11/2018 | Blair, II | H04W 4/02 |
| 2019/0332901 A1* | 10/2019 | Doumbouya | G01S 13/867 |
| 2019/0371134 A1* | 12/2019 | Chen | G06K 9/00369 |
| 2020/0028703 A1* | 1/2020 | Homsi | G06N 3/08 |
| 2021/0035342 A1* | 2/2021 | Glaser | G06K 9/00335 |

FOREIGN PATENT DOCUMENTS

| | | |
|---|---|---|
| CN | 103926999 | 7/2014 |
| CN | 104038799 | 9/2014 |
| CN | 104714649 | 6/2015 |
| CN | 204465737 | 7/2015 |
| CN | 104866830 | 8/2015 |
| CN | 104899600 | 9/2015 |
| CN | 104899947 | 9/2015 |
| CN | 105608479 | 5/2016 |
| CN | 106530310 | 3/2017 |
| CN | 106886994 | 6/2017 |
| CN | 107067621 | 8/2017 |
| CN | 108039010 | 5/2018 |
| CN | 109271847 | 1/2019 |
| GN | 102467657 | 5/2012 |
| TW | 201801520 | 1/2018 |
| TW | 201814596 | 4/2018 |
| TW | 201826141 | 7/2018 |

OTHER PUBLICATIONS

Geekpark.net [online], "What are the noteworthy black technologies in the unmanned supermarket of Alibaba," Jul. 7, 2017, retrieved on Nov. 23, 2020, retrieved from URL<https://www.geekpark.net/news/220377, 24 pages (with machine translation).

Nakamoto, "Bitcoin: A Peer-to-Peer Electronic Cash System," www.bitcoin.org, 2005, 9 pages.

PCT International Search Report and Written Opinion in International Application No. PCT/CN2019/089187, dated Sep. 5, 2019, 9 pages (with partial English translation).

Sina.com [online], "What are the noteworthy black technologies in the unmanned supermarket of Alibaba," Jul. 7, 2017, retrieved on Nov. 23, 2020, retrieved from URL<http://tech.sina.com.cn/roll/2017-07-07/doc-fyhvyie0525331.shtml>, 13 pages (with machine translation).

Sohu.com [online], "Who is better? JD Unmanned Supermarket vs Ali Unmanned Supermarket?," Dec. 6, 2017, retrieved on Nov. 20, 2020, retrieved from URL<https://www.sohu.com/a/208496789_100078322>, 26 pages (with machine translation).

Woshipm.com [online], "Analysis of Unmanned Supermarket Competitive Products (1): Amoy Coffee vs Amazon Go," Nov. 12, 2017, retrieved on Nov. 20, 2020, retrieved from URL<http://www.woshipm.com/evaluating/844631.html>, 40 pages (with machine translation).

PCT International Preliminary Report on Patentability in International Application No. PCT/CN2019/089187, dated Feb. 2, 2021, 10 pages (with English translation).

Camplani et al., "Multiple human tracking in RGB-depth data: a survey," IET Computer Vision, Jun. 2017, 11 (4):265-285.

Extended European Search Report in European Application No. 19844523.1, dated Apr. 23, 2021, 13 pages.

Hu et al., "A Survey on Visual Surveillance of Object Motion and Behaviors," IEEE Transactions on Systems, Man, and Cybernetics: Part C: Applications and Reviews, Aug. 2004, 34(3):334-352.

* cited by examiner

ABNORMALITY DETECTION METHOD, APPARATUS, AND DEVICE FOR UNMANNED CHECKOUT

CROSS-REFERENCE TO RELATED APPLICATIONS

This application is a continuation of PCT Application No. PCT/CN2019/089187, filed on May 30, 2019, which claims priority to Chinese Patent Application No. 201810865617.8, filed on Aug. 1, 2018, and each application is hereby incorporated by reference in its entirety.

TECHNICAL FIELD

The present specification relates to the data processing field, and in particular, to abnormality detection methods, apparatuses, and devices for unmanned checkout.

BACKGROUND

With the development of science and technology, self-checkout or unmanned checkout scenarios are increasingly applied to daily life, for example, unmanned shops and unmanned stores. After selecting a product, the customer can enter a specified detection area for automatic detection and payment. In the detection area, a central control system can automatically detect the product purchased by the customer, send the product information to a payment platform, and complete an automatic payment operation. However, in the detection area, abnormal events may occur, causing losses to merchants or customers, etc. Therefore, an effective abnormality detection solution needs to be provided for unmanned checkout.

SUMMARY

To alleviate the problem in the related technology, the present specification provides abnormality detection methods, apparatuses, and devices for unmanned checkout.

According to a first aspect of some embodiments of the present specification, an abnormality detection method for unmanned checkout is provided, where a photographing area for unmanned checkout includes at least a depth camera of a detection area, the detection area is an area for detecting a to-be-paid product, and the method includes: obtaining image data in the depth camera, where the image data includes a depth image and an RGB image; detecting, by using the image data, one or more people that enter the detection area, where the detection includes one or more of headcount detection and gesture detection; and when it is determined, based on the detection result, that a predetermined abnormal condition is satisfied, notifying a central control system to stop product detection and triggering an alarm, where the abnormal condition includes one or more of the following: the quantity of the one or more people that enter the detection area is greater than a predetermined quantity threshold, and a gesture of the one or more people that enter the detection area is a predetermined abnormal gesture.

In some embodiments, the step of headcount detection includes: obtaining, from the currently obtained depth image based on a background model and the depth image, a foreground image for representing a moving object, where the background model is obtained based on background modeling using a depth image obtained when no moving object passes through the detection area; and if the foreground image is used to determine that the moving object is one or more people, performing connected component analysis on the foreground image with reference to a depth value in the depth image, and obtaining the quantity of the one or more people in the detection area based on the analysis result.

In some embodiments, the depth image and the RGB image are obtained by the depth camera by collecting the same scenario at the same moment, and the step of gesture detection includes: obtaining, from the currently obtained depth image based on a background model and the depth image, a foreground image for representing a moving object, where the background model is obtained based on background modeling using a depth image obtained when no moving object passes through the detection area; if the foreground image is used to determine that the moving object is one or more people, performing connected component analysis on the foreground image with reference to a depth value in the depth image, and segmenting a people area in the foreground image based on the analysis result to obtain a connected component that represents an independent people; and determining the gesture of the one or more people with reference to the connected component in the depth image and an area in the RGB image and corresponding to the connected component.

In some embodiments, determining the gesture of the one or more people with reference to the connected component in the depth image and an area in the RGB image and corresponding to the connected component includes: locating hands of the people in the connected component, in the depth image, that represent an independent people; if a hand area is obtained, performing skeleton detection of the hands on an area in the RGB image and corresponding to the hand area, and determining the gesture of the one or more people based on the detection result; and if a hand area is not obtained, obtaining an independent people area in the corresponding RGB image based on the connected component that represents an independent people in the depth image, performing skeleton detection of the hands on the independent people area in the RGB image, and determining the gesture of the one or more people based on the detection result.

In some embodiments, the method further includes one or more of the following: when it is detected, by using the depth image, that one or more people enter the detection area with no people, notifying the central control system to start product detection; and when it is detected, by using the depth image, that the current one or more people leave and no other people enters the detection area, notifying the central control system to stop product detection.

According to a second aspect of some embodiments of the present specification, an abnormality detection apparatus for unmanned checkout is provided, where a photographing area for unmanned checkout includes at least a depth camera of a detection area, the detection area is an area for detecting a to-be-paid product, and the apparatus includes: a data acquisition module, configured to obtain image data in the depth camera, where the image data includes a depth image and an RGB image; an abnormality detection module, configured to detect, by using the image data, one or more people that enter the detection area, where the detection includes one or more of headcount detection and gesture detection; and an abnormality processing module, configured to: when it is determined, based on the detection result, that a predetermined abnormal condition is satisfied, notify a central control system to stop product detection and trigger an alarm, where the abnormal condition includes one or more of the following: the quantity of one or more people that enter the detection area is greater than a predetermined quantity threshold, and a gesture of the one or more people that enter the detection area is a predetermined abnormal gesture.

In some embodiments, the abnormality detection module is configured to: obtain, from the currently obtained depth image based on a background model and the depth image, a foreground image for representing a moving object, where the background model is obtained based on background modeling using a depth image obtained when no moving object passes through the detection area; if the foreground image is used to determine that the moving object is one or more people, perform connected component analysis on the foreground image with reference to a depth value in the depth image, and obtain the quantity of the one or more people in the detection area based on the analysis result.

In some embodiments, the depth image and the RGB image are obtained by the depth camera by collecting the same scenario at the same moment, and the abnormality detection module is configured to: obtain, from the currently obtained depth image based on a background model and the depth image, a foreground image for representing a moving object, where the background model is obtained based on background modeling using a depth image obtained when no moving object passes through the detection area; if the foreground image is used to determine that the moving object is one or more people, perform connected component analysis on the foreground image with reference to a depth value in the depth image, and segment a people area in the foreground image based on the analysis result to obtain a connected component that represents an independent people; and determine the gesture of the one or more people with reference to the connected component in the depth image and an area in the RGB image and corresponding to the connected component.

In some embodiments, the abnormality detection module is specifically configured to: locate hands of the people, in the depth image, that represent an independent people; if a hand area is obtained, perform skeleton detection of the hands on an area in the RGB image and corresponding to the hand area, and determine the gesture of the one or more people based on the detection result; and if a hand area is not obtained, obtain an independent people area in the corresponding RGB image based on the connected component that represents an independent people in the depth image, perform skeleton detection of the hands on the independent people area in the RGB image, and determine the gesture of the one or more people based on the detection result.

According to a third aspect of some embodiments of the present specification, a computer device is provided, including a memory, a processor, and a computer program stored in the memory and running on the processor, where a photographing area for unmanned checkout includes at least a depth camera of a detection area, the detection area is an area for detecting a to-be-paid product, and the processor implements the following method when executing the program: obtaining image data in the depth camera, where the image data includes a depth image and an RGB image; detecting, by using the image data, one or more people that enter the detection area, where the detection includes one or more of headcount detection and gesture detection; and when it is determined, based on the detection result, that a predetermined abnormal condition is satisfied, notifying a central control system to stop product detection and triggering an alarm, where the abnormal condition includes one or more of the following: the quantity of one or more people that enter the detection area is greater than a predetermined quantity threshold, and a gesture of the one or more people that enter the detection area is a predetermined abnormal gesture.

The technical solutions provided in some embodiments of the present specification have the following beneficial effects:

In some embodiments of the present specification, a photographing area for unmanned checkout includes at least a depth camera of a detection area, and one or more people that enter the detection area can be detected by using image data obtained from the depth camera. Because the image data includes a depth image and an RGB image, and the detection area is an area for detecting a to-be-paid product, the depth image and the RGB image can be used to determine whether the quantity of the one or more people in the detection area is abnormal or the gesture of the people is abnormal, and further determine whether to notify a central control system to stop product detection and trigger an alarm, so as to avoid a loss caused by an abnormality to a customer or a merchant.

It should be understood that the previous general description and the following detailed description are merely examples, and impose no limitation on the present specification.

BRIEF DESCRIPTION OF DRAWINGS

The accompanying drawings, which are incorporated in and constitute a part of the present specification, illustrate embodiments consistent with the present specification and, together with the present specification, serve to explain the principles of the present specification.

DESCRIPTION OF EMBODIMENTS

Figure 1:
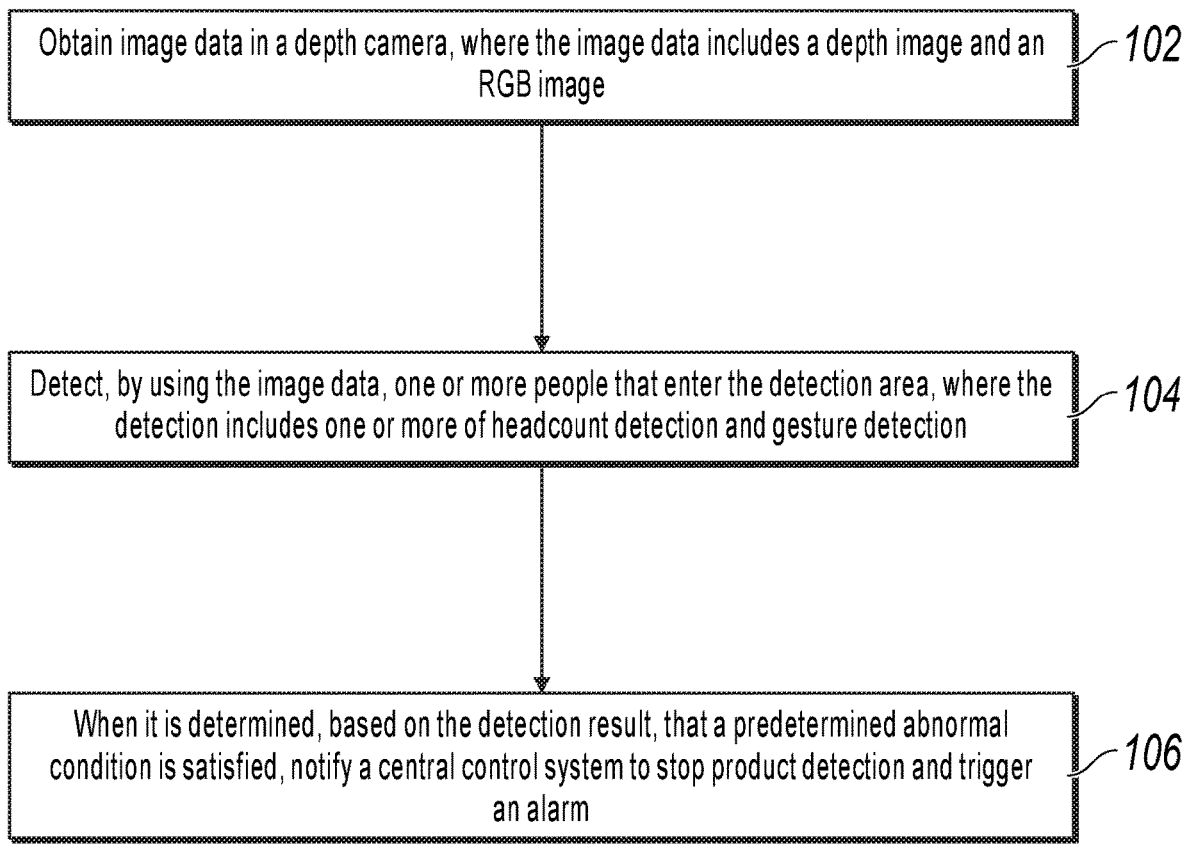
FIG. 1 is a flowchart illustrating an abnormality detection method for unmanned checkout, according to example embodiments of the present specification.

Example embodiments are described in detail here, and examples of the example embodiments are presented in the accompanying drawings. When the following description relates to the accompanying drawings, unless specified otherwise, same numbers in different accompanying drawings represent same or similar elements. Embodiments described in the following do not represent all embodiments consistent with the present specification. On the contrary, some embodiments are only examples of devices and methods that are described in the appended claims in details and consistent with some aspects of the present specification.

The terms used in the present specification are merely for illustrating specific embodiments, and are not intended to limit the present specification. The terms "a" and "the" of singular forms used in the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present specification to describe various types of information, the information is not limited to the terms. These terms are only used to distinguish between information of the same type. For example, without departing from the scope of the present specification, first information can also be referred to as second information, and similarly, the second information can be referred to as the first information. Depending on the context, for example, the word "if" used here can be explained as "while", "when", or "in response to determining".

With the development of mobile payment technologies, unmanned supermarkets appear, and they subvert the conventional retail mode because they are unmanned and customers independently make payment. After selecting a product, a customer can enter a detection area for product detection, so as to implement automatic payment, for example, enter a "payment gate" for payment. However, because of "being unmanned" feature, in the detection area, there may be a case that a customer lifts a product to avoid being detected, or an abnormality such as identifying a product purchased by another customer as a product purchased by the current customer.

In view of this, embodiments of the present specification provide an abnormality detection solution for unmanned checkout. In some embodiments of the present specification, a photographing area for unmanned checkout includes at least a depth camera of a detection area, and one or more people that enter the detection area can be detected by using image data obtained from the depth camera. Because the image data includes a depth image and an RGB image, and the detection area is an area for detecting a to-be-paid product, the depth image and the RGB image can be used to determine whether the quantity of the one or more people in the detection area is abnormal or the gesture of the one or more people is abnormal, and further determine whether to notify a central control system to stop product detection and trigger an alarm, so as to avoid a loss caused by an abnormality to a customer or a merchant.

The following exemplarily describes some embodiments of the present specification with reference to the accompanying drawings.

FIG. 1 is a flowchart illustrating an abnormality detection method for unmanned checkout, according to example embodiments of the present specification. A photographing area for unmanned checkout includes at least a depth camera of a detection area, the detection area is an area for detecting a to-be-paid product, and the method can include the following steps:

In step 102, obtain image data in the depth camera, where the image data includes a depth image and an RGB image.

In step 104, detect, by using the image data, one or more people that enter the detection area, where the detection includes one or more of headcount detection and gesture detection.

In step 106, when it is determined, based on the detection result, that a predetermined abnormal condition is satisfied, notify a central control system to stop product detection and trigger an alarm, where the abnormal condition includes one or more of the following: the quantity of one or more people that enter the detection area is greater than a predetermined quantity threshold, and a gesture of the one or more people that enter the detection area is a predetermined abnormal gesture.

In some embodiments, the unmanned checkout scenario can be a scenario that no manual product payment is performed, for example, a scenario such as an unmanned supermarket, an unmanned store, or an unmanned shopping mall. In some embodiments, a customer can complete a product detection operation in the detection area, and the central control system can send the detection result to a payment platform, so the payment platform completes a payment operation. For example, product detection is completed in a detection area instructed by a payment gate, and then a product payment operation is completed. In some embodiments, the payment gate can be a payment channel having at least one gate, and product detection can be completed in the channel, and a product payment operation can be completed in the channel, or does not have to be completed in the channel. For example, in some embodiments, the gate is controlled to be closed until the payment is completed. In some embodiments, because a payment account of the customer is associated in advance, the door can be controlled to be opened when product detection is completed, and a payment operation is subsequently performed, so the customer does not need to wait for the payment process to end. Therefore, the payment channel can also be referred to as a detection channel. In one example, the payment channel can be enclosed region. In another example, to improve user experience, the payment channel does not need to be enclosed region.

The method in some embodiments of the present specification can be applied to an unmanned checkout scenario. In some embodiments, the method can be applied to an embedded development board disposed in the payment channel, and the embedded development board can have a GPU operation function, so as to implement integration of abnormality detection and product detection.

Further, a model compression method can be further used to reduce the calculation amount of the embedded development board.

In unmanned checkout of some embodiments, the photographing area includes at least the depth camera of the detection area. The depth camera can be an imaging device that can collect a depth image and an RGB image. Each pixel value of the depth image can be used to represent the distance between a certain point in the scenario and the imaging device, and the pixel value can also be referred to as a depth value or depth information of the pixel. Different depth cameras can use different depth image acquisition methods. For example, a depth camera including dual RGB cameras can be used to obtain a depth image by using a stereo matching method that matches both eyes. For another example, a depth camera including an RGB camera+a structured light projector (infrared)+a structured light depth sensor can be used to obtain a depth image by using a structured light detection method. It should be understood that another depth camera and another method for obtaining a depth image can also be used, and details are omitted here for simplicity.

The photographing area of the depth camera includes at least a detection area, and the depth camera can be disposed at a location associated with the payment channel for this purpose. In some embodiments, the depth camera can be disposed at the end of the payment channel, and the depth camera can be disposed provided that the detection area can be photographed, so when a customer walks from the head end of the payment channel to the tail end, a depth value used to indicate the customer in the depth image becomes smaller and smaller.

To detect, by using the image data, one or more people that enter the detection area, the detection area can be pre-marked, so as to determine a relationship between the detection area and the image in an actual scenario. In some embodiments, an area in the image and corresponding to the detection area can be marked by detecting a specified object disposed at the edge of the detection area. For example, the specified object is disposed at the edge of the detection area in the actual scenario to determine the edge of the detection area. The depth image and the RGB image are obtained from the depth camera, image recognition is performed by using the RGB image to detect the area of the specified object in the image, and a depth value of the specified object is obtained by using the depth image, so as to complete automatic marking of the detection area. In some embodiments, the specified object can be a square plate to reduce the detection difficulty.

In some embodiments of the present specification, the one or more people that enter the detection area can be detected by using the image data, so as to determine whether an abnormal event occurs, give an alarm when an abnormal event occurs, and stop product detection. The abnormal event can be determined based on a specific application scenario, and different predetermined abnormal conditions are configured based on different abnormal events.

In some embodiments, to avoid misidentifying a product of another customer as a product of the current customer, the quantity of the one or more people that enter the detection area can be limited. The abnormal condition can include that the quantity of one or more people that enter the detection area is greater than a predetermined quantity threshold. Correspondingly, when the quantity of one or more people that enter the detection area is greater than the predetermined quantity threshold, it is determined that an abnormal event occurs. The predetermined quantity threshold is determined based on a device configured in an application scenario. In an example, the predetermined quantity threshold can be 1, so the quantity of the one or more people to enter the detection area is limited to 1. When the quantity of the one or more people is greater than 1, product detection is stopped and an alarm is triggered.

The quantity of the one or more people can be obtained based on detecting of the depth image obtained from the depth camera. For example, moving pedestrian detection and pedestrian segmentation are performed based on the depth image to obtain the quantity of the one or more people in the detection area. The following uses a specific embodiment as an example for description. The step of headcount detection can include: obtaining, from the currently obtained depth image based on a background model and the depth image, a foreground image for representing a moving object, where the background model is obtained based on background modeling using a depth image obtained when no moving object passes through the detection area; if the foreground image is used to determine that the moving object is one or more people, performing connected component analysis on the foreground image with reference to a depth value in the depth image, and obtaining the quantity of the one or more people in the detection area based on the analysis result.

Background modeling can be continuously updated dynamically, and data can be continuously read and background modeling can be re-performed. For example, the background model obtained in the previous update is used to determine whether there is anyone in the detection area, periodically obtain an image without anyone included, and update the background model in the previous update by using a Gaussian background modeling method. The initial background model is obtained by initializing the collected image without anyone included.

By comparing the currently obtained depth image (the depth image of the current frame) with the background model, a foreground image used to represent a moving object can be obtained from the depth image of the current frame. For example, the depth image of the current frame is compared with the background image, the difference between the two in each corresponding pixel is calculated, and position coordinates of each pixel at which the difference satisfies a specific condition are found, so as to obtain the foreground image.

In some embodiments, the background modeling process can be completed by using a depth video. When an object enters the detection area, a moving object with a change can be considered as a motion foreground, and then it is determined, by using an image recognition technology, whether the moving object is one or more people.

Because depth values of one people are often relatively close to each other, and the same individual has connectivity, connected component analysis can be performed on the foreground image with reference to the depth value in the depth image, and the quantity of the one or more people in the detection area is obtained based on the analysis result. A connected component can be an image region (Region, Blob) that is formed by foreground pixels having similar pixel values and adjacent positions in the image. The connected component analysis can refer to finding and marking each connected component in the image.

In one example, connected component analysis can be performed on the foreground image based on domain determination. Whether properties of pixels at a domain location of a pixel are similar to the property of the pixel is determined, and pixels having the similar properties are classified as the same whole. In some embodiments, being similar in the property can mean being similar in the depth value.

It can be understood from the previous embodiments that, in some embodiments, the foreground image is extracted in the background modeling method, and when it is determined that a moving object in the foreground image is one or more people, connected component analysis is performed on the foreground image with reference to the depth value in the depth image, to implement people segmentation. Compared with people segmentation by using the RGB image, the quantity of the one or more people in the detection area can be quickly obtained, and the calculation amount is reduced.

In some embodiments, a customer may perform some abnormal behaviors, especially an abnormal gesture, so as to avoid payment. Therefore, a gesture of one or more people that enter the detection area can be detected, and when the gesture of the one or more people that enter the detection area is a predetermined abnormal gesture, it is determined that an abnormal event occurs. The predetermined abnormal gesture can be determined based on a detectable range of a product detection apparatus. For example, a gesture that can exceed the detectable range of the detection apparatus can be determined as a predetermined abnormal gesture. For example, the predetermined abnormal gesture can be a hand lifting gesture or a hand raising gesture, and a product can be prevented from being monitored when a customer makes the abnormal gesture. In some scenarios, the abnormal gesture can be further distinguished by the left and right hands, so as to avoid different determining results when different hands make the same gesture. The abnormal gesture of the left and right hands can be determined based on specific scenarios.

The gesture can be obtained based on detecting of the depth image and the RGB image obtained from the depth camera. The depth image and the RGB image are obtained by the depth camera by collecting the same scenario at the same moment. The depth image and the RGB image reflect images of the same scenario by using different data. The depth image reflects the distance between a certain point in the scenario and the imaging device by using a depth value. In one example, moving pedestrian detection, pedestrian segmentation, hands of the person locating and capturing, and gesture recognition are performed based on depth images and RGB images to obtain gestures of pedestrians in the detection area. The following uses a specific embodiment as an example for description. The step of gesture detection can include: obtaining, from the currently obtained depth image based on a background model and the depth image, a foreground image for representing a moving object, where the background model is obtained based on background modeling using a depth image obtained when no moving object passes through the detection area; if the foreground image is used to determine that the moving object is one or more people, performing connected component analysis on the foreground image with reference to a depth value in the depth image, and segmenting a people area in the foreground image based on the analysis result to obtain a connected component that represents an independent people; and determining the gesture of the one or more people with reference to the connected component in the depth image and an area in the RGB image and corresponding to the connected component.

Foreground image acquisition, people determining, and connected component analysis are the same as those in the related technologies of headcount detection, and details are omitted here for simplicity. In some embodiments, the depth image is used to obtain a connected component that represents an independent people. Compared with the RGB image being used to obtain a connected component that represents an independent people, the calculation amount can be reduced.

In some embodiments, after the connected component that represents an independent people is obtained by using the depth image, the gesture of the one or more people can be determined with reference to the connected component in the depth image and an area in the RGB image and corresponding to the connected component. After the connected component is obtained, gesture recognition can be performed with reference to the RGB image and the depth image. For example, the confidence degree of a hand area is determined by using the depth image. If the confidence degree is greater than a predetermined threshold, the hand area in the depth image is mapped to the RGB image, and gesture determining is performed on an area in the RGB image and corresponding to the hand area. If the hand area cannot be determined by using the depth image, the connected component in the depth image is mapped to the RGB image, and the hand area and the gesture are determined by using the RGB image. Specifically, determining the gesture of the one or more people with reference to the connected component in the depth image and an area in the RGB image and corresponding to the connected component can include: locating hands of the people, in the depth image, that represent an independent people; if a hand area is obtained, performing skeleton detection of the hands on an area in the RGB image and corresponding to the hand area, and determining the gesture of the one or more people based on the detection result; and if a hand area is not obtained, obtaining an independent people area in the corresponding RGB image based on the connected component that represents an independent people in the depth image, performing skeleton detection of the hands on the independent people area in the RGB image, and determining the gesture of the one or more people based on the detection result.

In some embodiments, a separate depth connected component of each people can be obtained by using people segmentation information, a hand area relative to the front of the people is obtained by using the depth information of a separate people, and finally, a left hand and a right hand are determined and captured by using a relative position between the front area and the people area, so as to obtain the hand area. The hand area in the corresponding area of the RGB image is captured by using the location of the hand area obtained in the depth image, so as to obtain the hand image. Hand skeleton shape recognition is performed on the hand image to obtain the shape of the hand skeleton, and then gesture recognition is performed accordingly. For example, the hand skeleton can be obtained by using a skeleton detection of the hands method, and then the shapes of the five finger skeletons in the hand skeleton are determined to implement recognition of a hand action.

It can be understood from the previous embodiments that the hand area is first obtained by using the depth image, then skeleton detection of the hands is performed on the area in the RGB image and corresponding to the hand area, and the gesture of the one or more people is determined based on the detection result, thereby reducing the calculation amount.

It should be understood that the abnormal condition can further include another condition. For example, the posture of the one or more people that enter the detection area is a predetermined abnormal posture. Therefore, the detection can further include people posture detection. For another case, details are omitted here for simplicity.

When the predetermined abnormal condition is satisfied, the central control system can be notified to stop product detection and an alarm is triggered. Product detection is before the payment operation. Therefore, when the product detection is interrupted, the payment operation is also interrupted. The central control system can be a system for detecting a product before payment. Detecting a product can include identifying a product and obtaining product information required for payment, such as the product quantity and price. For example, a radio frequency identification (RFID) technology can be used to read an electronic tag on a product to obtain product information required for payment. Certainly, another method can be used to detect the product to obtain the product information required for payment, which is not limited here. The alarm can be triggered by the current administrator by using the central control system, or the current administrator directly notifies an alarm module to perform the alarm.

It can be understood from the previous embodiments that, in some embodiments, a photographing area for unmanned checkout includes at least a depth camera of a detection area, and one or more people that enter the detection area can be detected by using image data obtained from the depth camera. Because the image data includes a depth image and an RGB image, and the detection area is an area for detecting a to-be-paid product, the depth image can be used to determine whether the quantity of the one or more people in the detection area is abnormal or the depth image and the RGB image can be used to determine whether the gesture of the one or more people in the detection area is abnormal, and further determine whether to notify a central control system to stop product detection and trigger an alarm, so as to avoid a loss caused by an abnormality to a customer or a merchant.

To avoid a waste of resources caused by real-time detection performed by the central control system, in some embodiments, the central control system is notified to start product detection only when it is detected, by using the depth image, that one or more people enter a detection area that no people exists.

In some embodiments, the product detection function can be enabled when a people newly appears in the detection area. It can be understood that the product detection operation is triggered only when a people enters a detection area with no other people's presence in it, and the product detection function can be automatically enabled.

In some embodiments, when it is detected, by using the depth image, that the current one or more people leave and no other people enters the detection area, the central control system is notified to stop product detection.

In some embodiments, when the one or more people leave the detection area and no other people enters the detection area, the product detection function can be disabled. Further, within a predetermined time period after the current one or more people leave the detection area, if no other people enters the detection area, the central control system can be notified to stop product detection.

It can be understood that the product detection function can be automatically disabled by using the depth image, so as to avoid a waste of resources caused by real-time detection performed by the central control system.

Various technical features in the previous embodiments can be combined randomly, provided that the combinations of the features do not conflict or contradict, and the combinations are not described one by one here due to length limitation. Therefore, any combination of the various technical features in the previous embodiments also falls within the scope disclosed in the present specification.

The following uses one of the combinations as an example for description.

Figure 2:
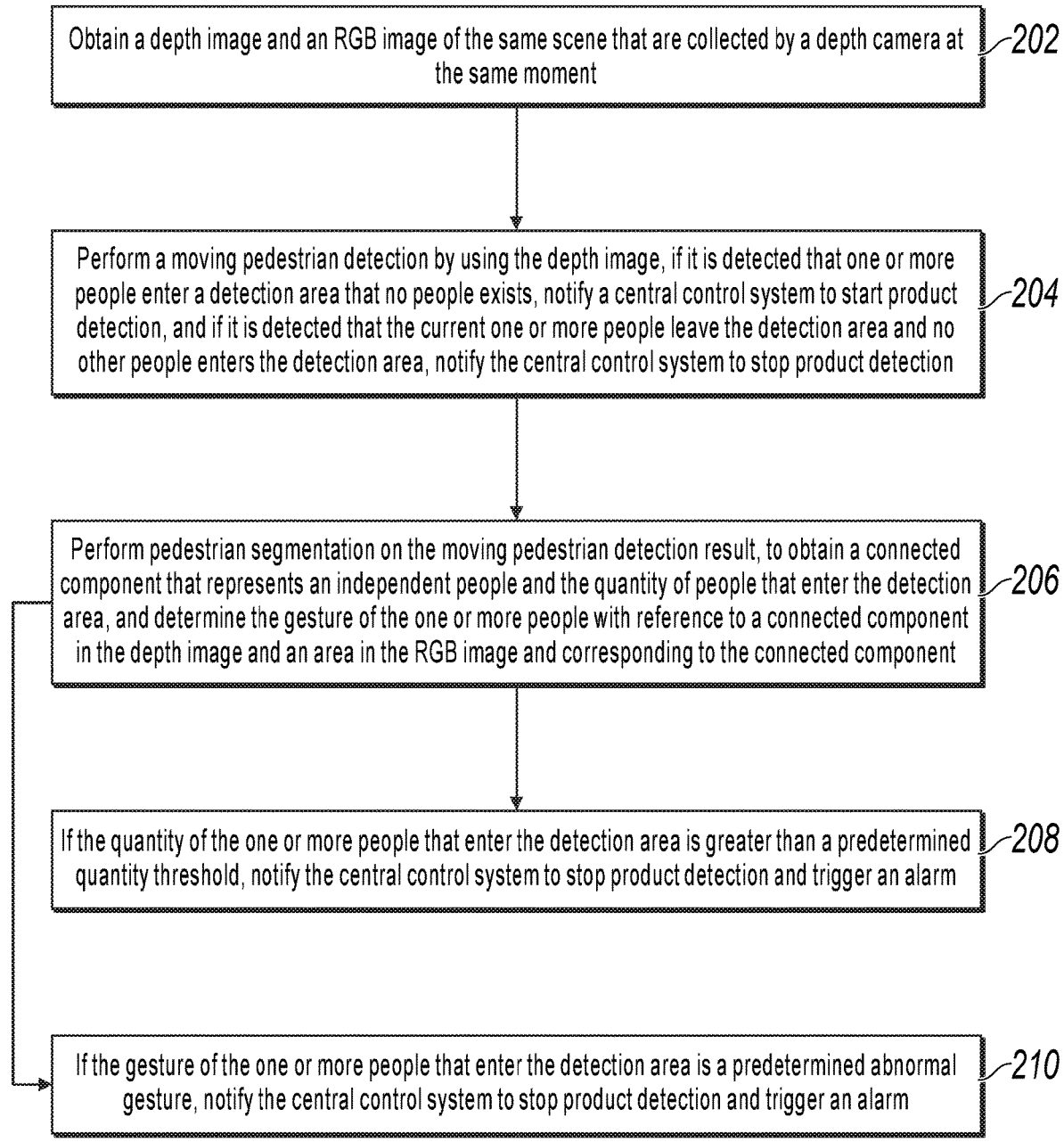
FIG. 2 is a flowchart illustrating another abnormality detection method for unmanned checkout, according to example embodiments of the present specification.

FIG. 2 is a flowchart illustrating another abnormality detection method for unmanned checkout, according to example embodiments of the present specification. A photographing area for unmanned checkout includes at least a depth camera of a detection area, the detection area is an area for detecting a to-be-paid product, and the method can include the following steps:

In step 202, obtain a depth image and an RGB image of the same scene that are collected by the depth camera at the same moment.

The depth camera can be in a steady-on state, or can be in a steady-on state in a specified working time period. For example, the specified working time can be the business hours of an unmanned store.

In step 204, perform a moving pedestrian detection by using the depth image, if it is detected that one or more people enter a detection area that no people exists, notify a central control system to start product detection, and if it is detected that the current one or more people leave the detection area and no other people enters the detection area, notify the central control system to stop product detection.

In an example, a foreground image used to represent a moving object can be obtained from the currently obtained depth image based on a background model and the depth image, and whether the moving object is one or more people is determined by using the foreground image.

In step 206, perform pedestrian segmentation on the moving pedestrian detection result, to obtain a connected component that represents an independent people and the quantity of one or more people that enter the detection area, and determine the gesture of the one or more people with reference to a connected component in the depth image and an area in the RGB image and corresponding to the connected component.

Connected component analysis can be performed on the foreground image with reference to a depth value of the depth image, so as to perform pedestrian segmentation.

In step 208, if the quantity of one or more people that enter the detection area is greater than a predetermined quantity threshold, notify the central control system to stop product detection and trigger an alarm.

In step 210, if the gesture of the one or more people that enter the detection area is a predetermined abnormal gesture, notify the central control system to stop product detection and trigger an alarm.

For the related technologies in FIG. 2 that are the same as those in FIG. 1, details are omitted here for simplicity.

In some embodiments, moving pedestrian detection and pedestrian segmentation are implemented by using the depth image, and the gesture of the one or more people is determined with reference to the connected component in the depth image and the region in the RGB image and corresponding to the connected component, thereby reducing the calculation amount. In addition, the product detection function can be automatically controlled to be enabled or disabled, so as to avoid a waste of resources caused by the product detection function being in a steady-on state. In addition, when the quantity of the one or more people in the detection area is abnormal and the gesture of the one or more people is abnormal, the central control system can be notified to stop product detection and an alarm can be triggered, so as to avoid a loss caused by an abnormality to a customer or a merchant.

Figure 3:
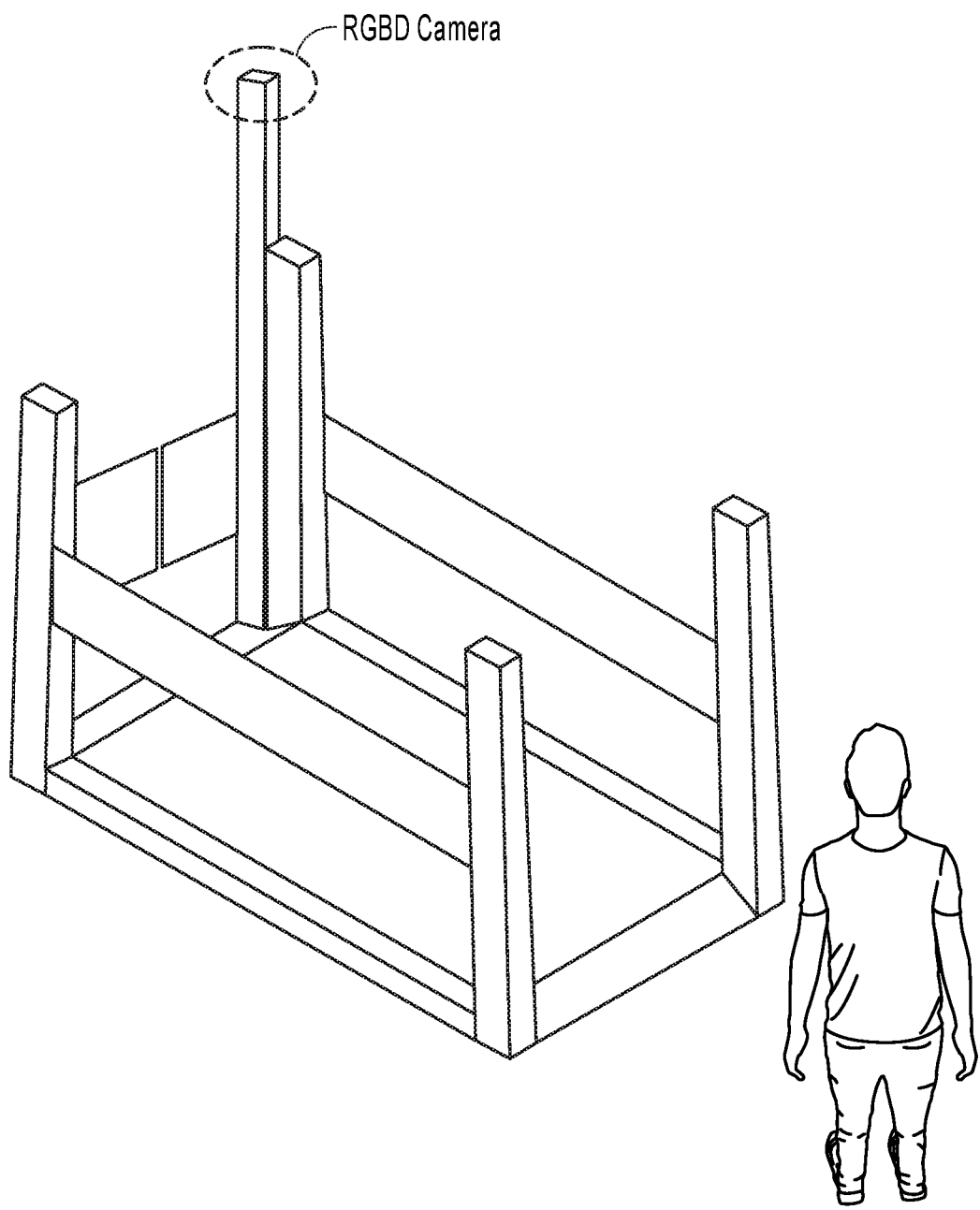
FIG. 3 is a schematic diagram illustrating an application scenario of an abnormality detection method, according to example embodiments of the present specification.

Some embodiments of the present specification further use a specific application scenario as an example to describe an abnormality detection solution for unmanned checkout. FIG. 3 is a schematic diagram illustrating an application scenario of an abnormality detection method, according to example embodiments of the present specification. In some embodiments, a payment channel can be non-enclosed, and a depth camera can be an RGBD camera disposed at the tail end of the payment channel. The area of the payment channel is a detection area. Because a depth image and an RGB image can be obtained in real time from the RGBD camera, whether a customer enters the detection area can be determined by using the depth image. If yes, a central control system can be notified to enable a product detection function. The depth image and the RGB image are used to determine whether an abnormal event occurs. When an abnormal event occurs, the central control system is prevented from detecting the product held by the customer, and an alarm is triggered to avoid a conflict of interests caused by the abnormal event. If no abnormal event occurs, the central control system can continue to perform product detection, send obtained product information to a payment platform, and complete a payment operation by using the payment platform. For example, when multiple customers exist in the detection area, the central control system can be controlled to stop detecting products held by the customers, and trigger an alarm. When a customer makes an abnormal gesture in the detection area, the central control system can be controlled to stop detecting the product held by the customer, and trigger an alarm. A gate can also be disposed at the tail end of the payment channel. When the detection or payment is completed, the gate is opened to release the customer.

Corresponding to the previous embodiments of the abnormality detection method for unmanned checkout, the present specification further provides some embodiments of an abnormality detection apparatus for unmanned checkout and an electronic device that the apparatus is applied.

Figure 4:
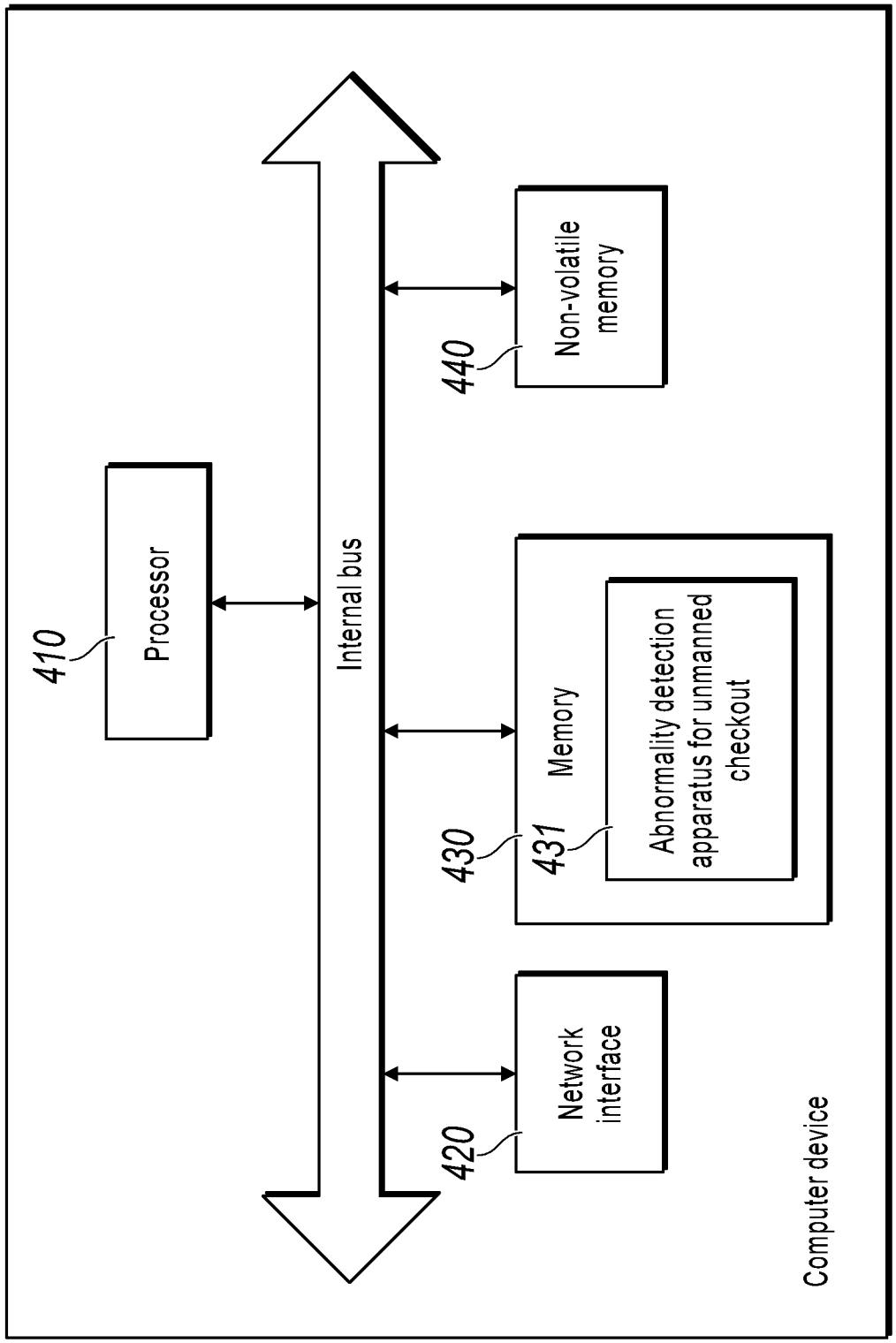
FIG. 4 is a hardware structural diagram illustrating a computer device that an abnormality detection apparatus for unmanned checkout is located, according to example embodiments of the present specification.

Some embodiments of an abnormality detection apparatus for unmanned checkout in the present specification can be applied to a computer device, and the computer device can have a GPU operation function. The apparatus embodiment can be implemented by software, hardware, or a combination of hardware and software. Software embodiment is used as an example. As a logical apparatus, the apparatus is formed by reading a corresponding computer program instruction in a non-volatile memory to a memory by a processor of a computer device where the apparatus is located. In terms of the hardware level, FIG. 4 is a schematic diagram illustrating a hardware structure of a computer device that an abnormality detection apparatus for unmanned checkout is located. In addition to a processor 410, a network interface 420, a memory 430, and a non-volatile memory 440 shown in FIG. 4, the computer device that an abnormality detection apparatus 431 for unmanned checkout is located in some embodiments can further include other hardware based on actual functions of the device. Details are omitted here for simplicity.

Figure 5:
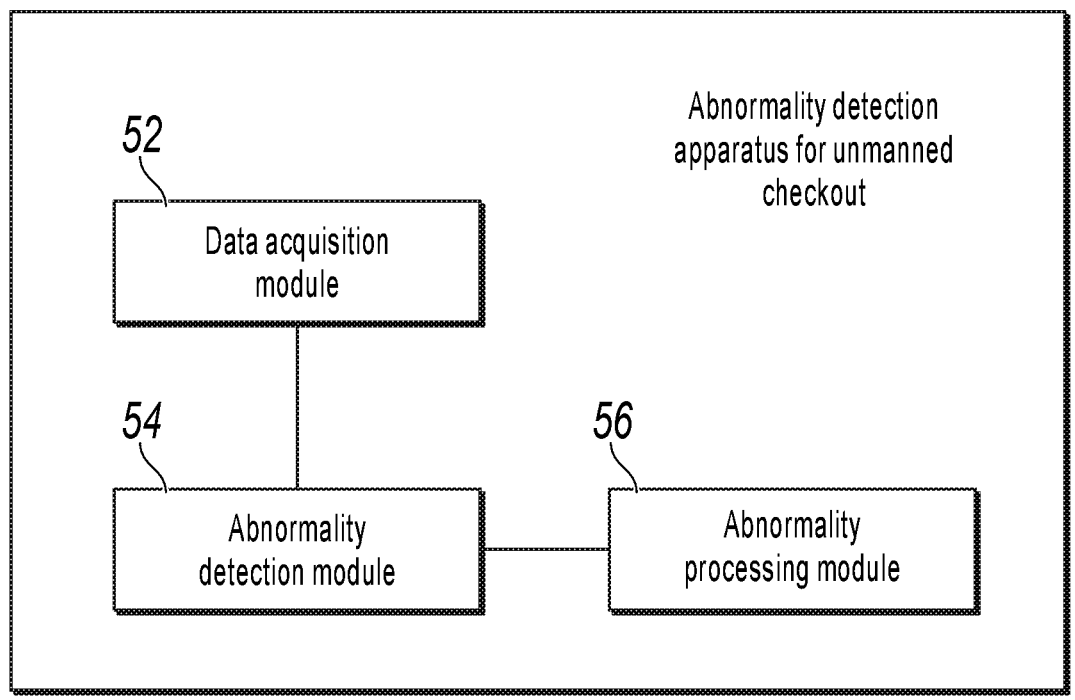
FIG. 5 is a block diagram illustrating an abnormality detection apparatus for unmanned checkout, according to example embodiments of the present specification.

FIG. 5 is a block diagram illustrating an abnormality detection apparatus for unmanned checkout, according to example embodiments of the present specification. A photographing area for unmanned checkout includes at least a depth camera of a detection area, the detection area is an area for detecting a to-be-paid product, and the apparatus includes: a data acquisition module 52, configured to obtain image data in the depth camera, where the image data can include a depth image and an RGB image; an abnormality detection module 54, configured to detect, by using the image data, one or more people that enter the detection area, where the detection includes one or more of headcount detection and gesture detection; and an abnormality processing module 56, configured to: when it is determined, based on the detection result, that a predetermined abnormal condition is satisfied, notify a central control system to stop product detection and trigger an alarm, where the abnormal condition includes one or more of the following: the quantity of one or more people that enter the detection area is greater than a predetermined quantity threshold, and a gesture of the one or more people that enter the detection area is a predetermined abnormal gesture.

In some embodiments, the abnormality detection module 54 is configured to: obtain, from the currently obtained depth image based on a background model and the depth image, a foreground image for representing a moving object, where the background model is obtained based on background modeling using a depth image obtained when no moving object passes through the detection area; and if the foreground image is used to determine that the moving object is one or more people, perform connected component analysis on the foreground image with reference to a depth value in the depth image, and obtain the quantity of the one or more people in the detection area based on the analysis result.

In some embodiments, the depth image and the RGB image are obtained by the depth camera by collecting the same scenario at the same moment, and the abnormality detection module 54 is configured to: obtain, from the currently obtained depth image based on a background model and the depth image, a foreground image for representing a moving object, where the background model is obtained based on background modeling using a depth image obtained when no moving object passes through the detection area; if the foreground image is used to determine that the moving object is one or more people, perform connected component analysis on the foreground image with reference to a depth value in the depth image, and segment a people area in the foreground image based on the analysis result to obtain a connected component that represents an independent people; and determine the gesture of the one or more people with reference to the connected component in the depth image and an area in the RGB image and corresponding to the connected component.

In some embodiments, the abnormality detection module 54 is specifically configured to: locate hands of the people, in the depth image, that represent an independent people; if a hand area is obtained, perform skeleton detection of the hands on an area in the RGB image and corresponding to the hand area, and determine the gesture of the one or more people based on the detection result; and if a hand area is not obtained, obtain an independent people area in the corresponding RGB image based on the connected component that represents an independent people in the depth image, perform skeleton detection of the hands on the independent people area in the RGB image, and determine the gesture of the one or more people based on the detection result.

In some embodiments, the abnormality processing module 56 is further configured to perform one or more of the following: when it is detected, by using the depth image, that one or more people enter the detection area with no people, notifying the central control system to start product detection; and when it is detected, by using the depth image, that the current one or more people leave and no other people enters the detection area, notifying the central control system to stop product detection.

Because the apparatus embodiments basically correspond to the method embodiments, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a plurality of network modules. Some or all of the modules can be selected based on actual needs to achieve the objectives of the solutions of the present specification. A person of ordinary skill in the art can understand and implement some embodiments of the present application without creative efforts.

Correspondingly, some embodiments of the present specification further provide a computer device, including a memory, a processor, and a computer program stored in the memory and running on the processor, where a photographing area for unmanned checkout includes at least a depth camera of a detection area, the detection area is an area for detecting a to-be-paid product, and the processor implements the following method when executing the program: obtaining image data in the depth camera, where the image data includes a depth image and an RGB image; detecting, by using the image data, one or more people that enter the detection area, where the detection includes one or more of headcount detection and gesture detection; and when it is determined, based on the detection result, that a predetermined abnormal condition is satisfied, notifying a central control system to stop product detection and triggering an alarm, where the abnormal condition includes one or more of the following: the quantity of one or more people that enter the detection area is greater than a predetermined quantity threshold, and a gesture of the one or more people that enter the detection area is a predetermined abnormal gesture.

Some embodiments in the present specification are described in a progressive way. For same or similar parts of some embodiments, references can be made to some embodiments. Each embodiment focuses on a difference from other embodiments. Particularly, a device embodiment is similar to a method embodiment, and therefore is described briefly. For related parts, references can be made to related descriptions in the method embodiment.

A computer storage medium, where the storage medium stores program instructions, and the program instructions include: obtaining image data in the depth camera, where the image data includes a depth image and an RGB image; detecting, by using the image data, one or more people that enter the detection area, where the detection includes one or more of headcount detection and gesture detection; and when it is determined, based on the detection result, that a predetermined abnormal condition is satisfied, notifying a central control system to stop product detection and triggering an alarm, where the abnormal condition includes one or more of the following: the quantity of one or more people that enter the detection area is greater than a predetermined quantity threshold, and a gesture of the one or more people that enter the detection area is a predetermined abnormal gesture.

Embodiments of the present specification can be used in a form of a computer program product implemented on one or more storage media (including but not limited to a disk memory, a CD-ROM, an optical memory, etc.) including program code. A computer readable storage medium includes persistent, non-persistent, removable, and unmovable media that can store information by using any method or technology. The information can be a computer readable instruction, a data structure, a program module, or other data. A computer storage medium includes but is not limited to a phase change memory (PRAM), a static random access memory (SRAM), a dynamic random access memory (DRAM), a random access memory (RAM) of another type, a read-only memory, an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device.

Persons skilled in the art can easily figure out another embodiment of the present specification after considering the present specification and practicing the present application here. The present specification is intended to cover any variations, uses, or adaptations of the present specification, and these variations, uses, or adaptations follow the general principles of the present specification and include common knowledge or conventional techniques that are not disclosed in the technical field of the present specification. The present specification and some embodiments are merely considered as examples, and the actual scope and the spirit of the present specification are pointed out by the following claims.

It should be understood that the present specification is not limited to the precise structures that have been described above and shown in the drawings, and various modifications and changes can be made without departing from the scope of the present specification. The scope of the present specification is limited by the appended claims only.

The previous descriptions are merely preferred embodiments of the present specification, but are not intended to limit the present specification. Any modification, equivalent replacement, or improvement made without departing from the spirit and principle of the present specification shall fall within the protection scope of the present specification.

What is claimed is:

1. A method for detecting abnormality for unmanned checkout, the method comprising:
   obtaining, by a depth camera in a detection area for unmanned checkout, image data that comprises a first depth image and a corresponding RGB image;
   detecting, using gesture detection and based on the first depth image and the corresponding RGB image, one or more gestures of customers that enter the detection area for unmanned checkout, wherein determining the one or more gestures of the customers comprises:
      identifying a first image region within the first depth image, wherein the first image region i) corresponds to hands of the customers and ii) comprises one or more image portions within the first depth image;
      in response to identifying the first image region within the first depth image,
         mapping the first image region in the first depth image to a second image region in the RGB image, the second image region corresponding to the hands of the customers; and
         determining, based on the second image region in the RGB image, the one or more gestures of the customers;
   determining that the one or more gestures comprise an abnormal gesture; and
   in response to determining that the one or more gestures comprise an abnormal gesture, notifying a central control system to stop the unmanned checkout and trigger an alarm.

2. The method according to claim 1, further comprising:
   determining, based on the first depth image, a quantity of customers entering the detection area for the unmanned checkout, wherein determining the quantity of customers comprises:
      comparing, the first depth image with a background model, to obtain a foreground image, wherein the foreground image is associated with one or more moving objects, and the background model is obtained based on a plurality of second depth images including stationary objects;
      identifying, in the foreground image, one or more regions representing the one or more moving objects, wherein each of the one or more regions is identified based on identifying a cluster of pixel values within a predetermined range of one another; and
   determining the quantity of customers based on the one or more regions,
   wherein determining the quantity of customers or the gesture detection comprises:
   determining that the one or more moving object are the customers; and
   performing connected component analysis on the foreground image based on one or more depth values of the depth image to obtain connected components representing the one or more regions.

3. The method according to claim 2, wherein determining the quantity of customers further comprises:

obtaining a headcount of the customers in the detection area based on results of the connected component analysis.

4. The method according to claim 2, wherein the first depth image and the corresponding RGB image are obtained by the depth camera at substantially a same time of a same scenario, and the gesture detection comprises:
detecting each of the customers in the foreground image based on results of the connected component analysis to obtain the connected components that represent the customers; and
determining the one or more gestures of the customers based on the connected components in the first depth image and one or more regions corresponding to the connected components in the RGB image.

5. The method according to claim 4, wherein determining the one or more gestures further comprises:
locating the first image region corresponding to the hands of the customers in the connected components in the first depth image; and
determining whether the first image region corresponding to the hands are located.

6. The method according to claim 5, further comprising:
performing skeleton detection of the hands on the second image region in the RGB image; and
determining the one or more gestures of the customers based on results of the skeleton detection.

7. The method according to claim 5, further comprising:
in response to determining that the first image region corresponding to the hands are not located, identifying regions in the RGB image corresponding to the connected components in the first depth image;
performing skeleton detection of the hands on the regions in the RGB image; and
determining the one or more gestures of the customers based on results of the skeleton detection.

8. The method according to claim 1, further comprising:
detecting, based on the first depth image, that the customers enter the detection area that is unoccupied; and
notifying the central control system to start unmanned checkout.

9. The method according to claim 8, further comprising:
detecting, based on the first depth image, that the customers exit the detection area and the detection area becomes unoccupied; and
notifying the central control system to stop unmanned checkout.

10. A non-transitory, computer-readable medium storing one or more instructions executable by a computer system to perform operations comprising:
obtaining, by a depth camera in a detection area for unmanned checkout, image data that comprises a first depth image and a corresponding RGB image;
detecting, using gesture detection and based on the first depth image and the corresponding RGB image, one or more gestures of customers that enter the detection area for unmanned checkout, wherein determining the one or more gestures of the customers comprises:
identifying a first image region within the first depth image, wherein the first image region i) corresponds to hands of the customers and ii) comprises one or more image portions within the first depth image;
in response to identifying the first image region within the first depth image,
mapping the first image region in the first depth image to a second image region in the RGB image, the second image region corresponding to the hands of the customers; and
determining, based on the second image region in the RGB image, the one or more gestures of the customers;
determining that the one or more gestures comprise an abnormal gesture; and
in response to determining that the one or more gestures comprise an abnormal gesture, notifying a central control system to stop the unmanned checkout and trigger an alarm.

11. The non-transitory, computer-readable medium according to claim 10, wherein the operations further comprise:
determining, based on the first depth image, a quantity of customers entering the detection area for the unmanned checkout, wherein determining the quantity of customers comprises:
comparing, the first depth image with a background model, to obtain a foreground image, wherein the foreground image is associated with one or more moving objects, and the background model is obtained based on a plurality of second depth images including stationary objects;
identifying, in the foreground image, one or more regions representing the one or more moving objects, wherein each of the one or more regions is identified based on identifying a cluster of pixel values within a predetermined range of one another; and
determining the quantity of customers based on the one or more regions,
wherein determining the quantity of customers or the gesture detection comprises:
determining that the one or more moving object are the customers; and
performing connected component analysis on the foreground image based on one or more depth values of the depth image to obtain connected components representing the one or more regions.

12. The non-transitory, computer-readable medium according to claim 11, wherein determining the quantity of customers further comprises:
obtaining a headcount of the customers in the detection area based on results of the connected component analysis.

13. The non-transitory, computer-readable medium according to claim 11, wherein the first depth image and the corresponding RGB image are obtained by the depth camera at substantially a same time of a same scenario, and the gesture detection comprises:
detecting each of the customers in the foreground image based on results of the connected component analysis to obtain the connected components that represent the customers; and
determining the one or more gestures of the customers based on the connected components in the first depth image and one or more regions corresponding to the connected components in the RGB image.

14. The non-transitory, computer-readable medium according to claim 13, wherein determining the one or more gestures further comprises:
locating the first image region corresponding to the hands of the customers in the connected components in the first depth image; and
determining whether the first image region corresponding to the hands are located.

15. The non-transitory, computer-readable medium according to claim 14, the operations further comprising:
performing skeleton detection of the hands on the second image region in the RGB image; and
determining the one or more gestures of the customers based on results of the skeleton detection.

16. The non-transitory, computer-readable medium according to claim 14, the operations further comprising:
in response to determining that the first image region corresponding to the hands are not located, identifying regions in the RGB image corresponding to the connected components in the first depth image;
performing skeleton detection of the hands on the regions in the RGB image; and
determining the one or more gestures of the customers based on results of the skeleton detection.

17. The non-transitory, computer-readable medium according to claim 10, the operations further comprising:
detecting, based on the first depth image, that the customers enter the detection area that is unoccupied; and
notifying the central control system to start unmanned checkout.

18. The non-transitory, computer-readable medium according to claim 17, the operations further comprising:
detecting, based on the first depth image, that the customers exit the detection area and the detection area becomes unoccupied; and
notifying the central control system to stop unmanned checkout.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
obtaining, by a depth camera in a detection area for unmanned checkout, image data that comprises a first depth image and a corresponding RGB image;
detecting, using gesture detection and based on the first depth image and the corresponding RGB image, one or more gestures of customers that enter the detection area for unmanned checkout using gesture detection, wherein determining the one or more gestures of the customers comprises:
identifying a first image region within the first depth image, wherein the first image region i) corresponds to hands of the customers and ii) comprises one or more image portions within the first depth image;
in response to identifying the first image region within the first depth image,
mapping the first image region in the first depth image to a second image region in the RGB image, the second image region corresponding to the hands of the customers; and
determining, based on the second image region in the RGB image, the one or more gestures of the customers;
determining that the one or more gestures comprise an abnormal gesture; and
in response to determining that the one or more gestures comprise an abnormal gesture, notifying a central control system to stop the unmanned checkout and trigger an alarm.

20. The computer-implemented system according to claim 19, wherein the operations further comprise:
determining, based on the first depth image, a quantity of customers entering the detection area for the unmanned checkout, wherein determining the quantity of customers comprises:
comparing, the first depth image with a background model, to obtain a foreground image, wherein the foreground image is associated with one or more moving objects, and the background model is obtained based on a plurality of second depth images including stationary objects;
identifying, in the foreground image, one or more regions representing the one or more moving objects, wherein each of the one or more regions is identified based on identifying a cluster of pixel values within a predetermined range of one another; and
determining the quantity of customers based on the one or more regions,
wherein determining the quantity of customers or the gesture detection comprises:
determining that the one or more moving object are the customers; and
performing connected component analysis on the foreground image based on one or more depth values of the depth image to obtain connected components representing the one or more regions.

21. The computer-implemented system according to claim 20, wherein determining the quantity of customers further comprises:
obtaining a headcount of the customers in the detection area based on results of the connected component analysis.

22. The computer-implemented system according to claim 20, wherein the first depth image and the corresponding RGB image are obtained by the depth camera at substantially a same time of a same scenario, and the gesture detection comprises:
detecting each of the customers in the foreground image based on results of the connected component analysis to obtain the connected components that represent the customers; and
determining the one or more gestures of the customers based on the connected components in the first depth image and one or more regions corresponding to the connected components in the RGB image.

23. The computer-implemented system according to claim 22, wherein determining the one or more gestures further comprises:
locating the first image region corresponding to the hands of the customers in the connected components in the first depth image; and
determining whether the first image region corresponding to the hands are located.

24. The computer-implemented system according to claim 23, the operations further comprising:
performing skeleton detection of the hands on the second image region in the RGB image; and
determining the one or more gestures of the customers based on results of the skeleton detection.

25. The computer-implemented system according to claim 23, the operations further comprising:
in response to determining that the first image region corresponding to the hands are not located, identifying regions in the RGB image corresponding to the connected components in the first depth image;
performing skeleton detection of the hands on the regions in the RGB image; and determining the one or more gestures of the customers based on results of the skeleton detection.

26. The computer-implemented system according to claim 19, the operations further comprising:
   detecting, based on the first depth image, that the customers enter the detection area that is unoccupied; and
   notifying the central control system to start unmanned checkout.

27. The computer-implemented system according to claim 26, the operations further comprising:
   detecting, based on the first depth image, that the customers exit the detection area and the detection area becomes unoccupied; and
   notifying the central control system to stop unmanned checkout.

* * * * *